United States Patent [19]

Statz

[11] 4,398,186
[45] Aug. 9, 1983

[54] SEWER BACK UP WARNING SYSTEM

[76] Inventor: Ralph M. Statz, 3703 Wildon Dr., Eau Claire, Wis. 54701

[21] Appl. No.: 267,709

[22] Filed: May 27, 1981

[51] Int. Cl.³ .............................................. G08B 21/00
[52] U.S. Cl. ..................................... 340/616; 73/308; 200/84 R; 340/608; 340/625
[58] Field of Search ............... 340/608, 616, 623, 624, 340/625, 607, 617; 200/61.04, 61.05, 61.06, 61.2, 61.21, 84 R; 73/308, 317

[56] References Cited

U.S. PATENT DOCUMENTS

| | | | |
|---|---|---|---|
| 1,768,446 | 6/1930 | Gron | 340/624 |
| 2,041,549 | 5/1936 | Jaeger | 340/616 |
| 3,531,767 | 9/1970 | Klein et al. | 340/625 |
| 3,774,187 | 11/1973 | Windham | 340/624 |
| 4,091,365 | 5/1978 | Allen | 340/625 |
| 4,187,503 | 2/1980 | Walton | 340/624 |

Primary Examiner—Donald J. Yusko
Assistant Examiner—Daniel Myer
Attorney, Agent, or Firm—Harvey B. Jacobson

[57] ABSTRACT

A sewer back up warning system includes a pair of electrically-conductive probe rods fixedly securable within a sewer clean out pipe and being in electrical communication with a sewer back up alarm. An electrically-conductive float is hingedly attached to a free end of one of the rods, such float serving to rise in the clean out pipe as a sewer backs up so as to eventually come into contact with the second rod to thus complete the electrical circuit containing the back up alarm. A corrosion check device is also provided which essentially consists of a manually-operable chain pull for effectively bringing the metallic float into electrical communication with the second rod so as to determine the presence of corrosion build up which would prevent the operation of the alarm. The rods may either be retained in a non-metallic disk positionable within a sewer clean out pipe at the time a dwelling is constructed or alternatively, the rods may be inserted directly through the sewer clean out pipe cap in dwellings that have already been built.

6 Claims, 3 Drawing Figures

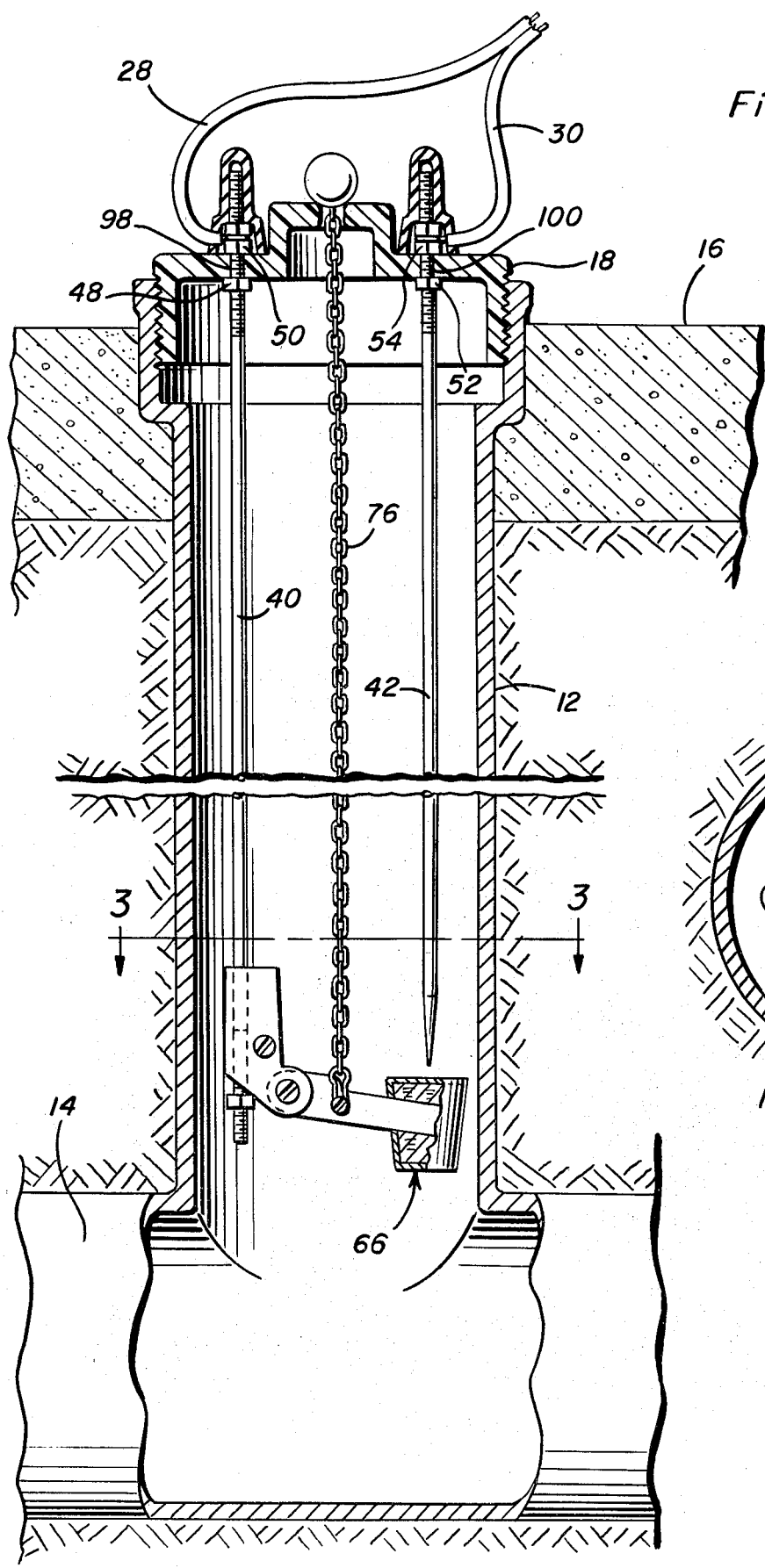
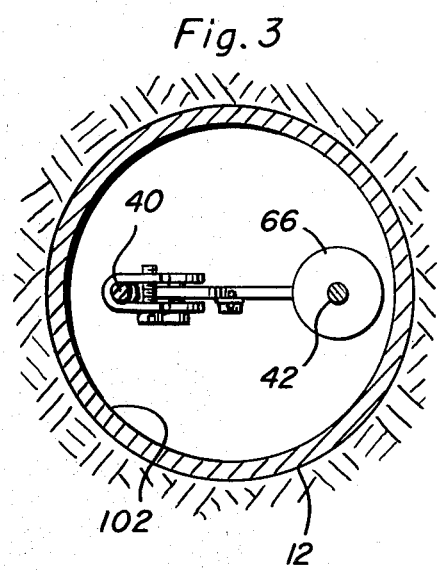
Fig. 2
Fig. 3

SEWER BACK UP WARNING SYSTEM

BACKGROUND OF THE INVENTION

1. Field of the Invention

The present invention relates generally to malfunction warning systems and more particularly pertains to an alarm which will signal the occurrence of a sewer back up.

2. Description of the Prior Art

Because of the growing demand for commercial and private sewer systems in this country and throughout the world, it can be appreciated that there is a tremendous need for efficient and reliable warning systems which indicate sewer malfunctions. In this respect, it is generally well known that sewers occasionally tend to become plugged, thus causing a sewer back up which could result in waste water flooding and severely damaging a dwelling interior. Usually, a dwelling occupant is not aware of the fact that a sewer is plugged until such time as the back up actually floods over into the dwelling space and accordingly, there has been a continuing search for efficient and reliable alarm systems which will provide an early indication of a sewer back up prior to any damage being done to the dwelling space. For example, U.S. Pat. No. 3,774,187, issued to Windham on Nov. 20, 1973, illustrates a sewer back up sensor assembly which includes a float fixedly positionable on the end of a reciprocably removable rod within an existing sewer clean out pipe and being operably connected within an electrically operated alarm circuit. During a sewer back up, the sewer water will rise in the clean out pipe, thus effecting a concurrent rise of the float and rod therein, and once the rod has risen a sufficient distance, an electrical switch is closed with effectively activates the alarm circuit. However, the Windham device is complex in its construction, requiring a plurality of specially manufactured parts to effect an attachment of the same to an existing sewer clean out pipe, and further, no means are provided for quickly and easily testing the circuit to determine the presence of corrosion build up. In this regard, corrosion build up over the electrical contacts of the Windham assembly would cause it to malfunction and such a corrosion build up is an expected and normal occurrence. Additionally, corrosion build up could prevent the upward movement of the rod through its guides so as to present a further possibility of alarm circuit failure.

By the same token, U.S. Pat. No. 4,091,365, issued to Allen on May 23, 1978, discloses a sewer drain alarm unit that includes a ball float suspendible in a sewer clean out pipe which, by its weight, serves to hold a pair of electrical contacts in a spaced apart open relationship. In this respect a pivotal arm is disclosed having a weight on one end and the ball float suspended by a chain on the other, with a magnet attached to the end of the arm supporting the ball float. If a sewer back up occurs, the float will rise within the pipe, thus permitting the magnet to rise and touch a magnetic switch resulting in a closing of the alarm circuit, thereby to signal the presence of the sewer back up. While the Allen alarm unit functions in the manner intended, it is of a complex construction including a specially manufactured cap member, and no means are provided for periodically testing for corrosion build up. Further, the ball float lays against the wall of the clean out pipe which can become very sticky and corroded, so as to possibly prevent the float from rising. Also, the magnet utilized in Allen can become weak in time, to the point of its being unable to activate the magnetic switch. Inasmuch as the sewer pipe may be of a metal construction, the magnet and magnetic switch could also prove to be unreliable.

Accordingly, it can be appreciated that there exists a continuing need for new and improved sewer back up alarms which may be easily and economically manufactured, which are efficient and reliable in their operation, and which may be quickly and easily installed in a sewer clean out pipe. In this regard, the present invention substantially fulfils this need.

SUMMARY OF THE INVENTION

The general purpose of the present invention, which will be subsequently described in greater detail, is to provide a new and improved sewer back up alarm that has all the advantages of the prior art sewer back up alarms and none of the disadvantages. To attain this, the present invention provides an alarm unit for new construction dwellings which consists of a solid non-metallic disk that is positionable inside the pipe fitting associated with the clean out trap of a sewer system. The disk has two holes drilled through it in which a pair of metallic probe rods are secured, such probe rods reaching down into the sewer just above the normal flow of water. A metallic hinge is placed on the end of one of these rods, such metallic hinge having a metallic covered float attached thereto, and the second rod, which is of a shorter construction, is placed in the second hole in the disk in such a position that when the metallic float rises from the force of a sewage back up in the sewer pipe, the float will come into contact with the second probe rod. Both of the probe rods are connected to an electric circuit that sounds an alarm when the metallic float comes into contact with the second probe rod.

A corrosion check device is built into the alarm system which includes a metallic rod and chain movably connected to the male cap of the sewer clean out trap. The rod passes through the male cap and also the non-metallic disk that holds the two probe rods, and the rod is further provided with an adjustment nut for controlling the length thereof which extends into the pipe, as well as a soft rubber seal which prevents the escape of sewer gases through the aperture in the non-metallic disk. The rod has a hook on the end thereof extending below the non-metallic disk, and the chain is attached to the hook and continues down inside the sewer pipe to the hinge that holds the float. When the rod and chain are manually raised by a handle or holding device, which is connected to an upper end of the rod, the float concurrently rises and closes the electrical circuit to sound the alarm. When the alarm sounds during a corrosion check, a user is assured that there is no corrosion on the metallic float and that the warning system is in good working order.

A second embodiment designed for existing construction dwellings dispenses with the use of the non-metallic disk that holds the probe rods. Instead, the rods are mounted directly through the male sewer cap that covers the clean out trap. These rods are then connected by low voltage wires to a transformer and alarm buzzer, in the same manner as the first embodiment of the invention, and the lower end of the probe rods are assembled the same as the first embodiment. The second embodiment also utilizes a corrosion check consisting only of a chain passing directly through the male cap to the hinge that raises the metallic float.

It is therefore an object of the present invention to provide an improved sewer back up alarm that has all the advantages of similarly employed prior art sewer back up alarms and none of the disadvantages.

It is another object of the present invention to provide an improved sewer back up alarm which may be easily and economically manufactured.

It is a further object of the present invention to provide an improved sewer back up alarm which is both simple in construction and limited in the number of moving parts.

Still another object of the present invention is to provide an improved sewer back up alarm that is efficient and reliable in its operation.

Yet another object of the present invention is to provide an improved sewer back up alarm that may be quickly and easily installed in either existing or new construction dwellings.

A still further object of the present invention is to provide an improved sewer back up alarm that is provided with a means for selectively testing the operability thereof.

Yet still another object of the present invention is to provide an improved sewer back up alarm that utilizes a manual corrosion check device.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a plan view, partly in section, illustrating a second embodiment of the sewer back up alarm forming the present invention operably installed in a sewer clean out trap.

FIG. 3 is a cross sectional view of the present invention taken along the line 3—3 of FIG. 2.

DESCRIPTION OF THE PREFERRED EMBODIMENTS

Figure 1:
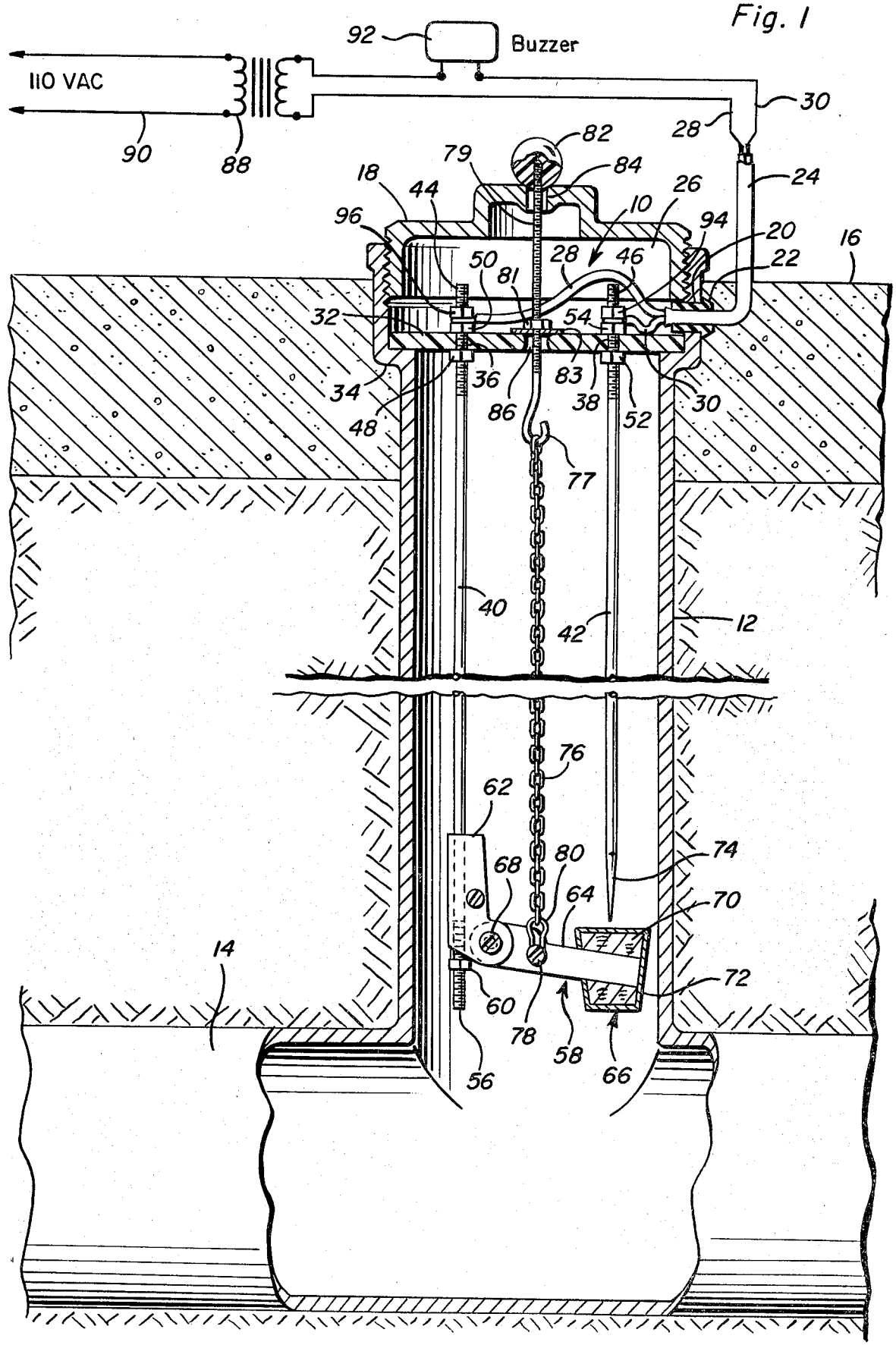
FIG. 1 is a plan view, partly in section, illustrating a first embodiment of the sewer back up alarm forming the present invention operably installed within a sewer clean out trap.

With reference now to the drawings and in particular to FIG. 1, an improved sewer alarm system for indicating sewer back up embodying the principles and concepts of the present invention and generally designated by the reference numeral 10 will be described. In this respect, it can be seen that the alarm system 10 is designed to be operably installed within an exising sewer clean out trap or pipe 12 which is in fluid communication with an exisiting sewer line 14. As shown, the clean out trap 12 normally extends through a floor 16 of a dwelling, such as the concrete floor of a basement or the like, and includes a cap 18 which is threadably attachable to the pipe 12.

In the embodiment of the present invention illustrated in FIG. 1, it can be appreciated that the same is designed for use in new construction dwellings whereby certain modifications can be made to the clean out trap 12 to effectively retain the alarm system 10 therein while the dwelling is being built. Specifically, an aperture 20 may be provided in the side of the clean out trap 12, into which a retaining member 22 may be positioned, and a conduit 24 may be directed through the retaining member 22 prior to the pouring of the concrete floor 16. In this respect, the conduit 24 extends from an interior portion 26 of the clean out trap 12 upwardly through the floor 16 so as to provide a means for directing electrical wires 28, 30 from the interior of the clean out pipe to a location remote therefrom.

With further reference to FIG. 1, it can be seen that the sewer back up alarm 10 includes a non-metallic disk 32 removably positionable against a lip or flange portion 34 of the clean out pipe 12. As illustrated, the disk 32 would normally be of a diameter which would permit a close conforming fit between the disk and the interior diameter of the clean out pipe 12 located above the lip portion 34. Additionally, the non-metallic disk 32 may be provided with first and second apertures 36, 38 through which metallic probe rods 40, 42 may then be respectively extended. Both of the probe rods 40, 42 are provided with respective threaded ends 44, 46 to facilitate the attachment of the rods to the non-metallic disk 32. In this connection, the probe rod 40 is provided with a first nut 48 selectively positionable on the rod below the non-metallic disk 32, and a second nut 50 being threadably positionable above the disk so as to secure the rod in position in a manner which permits a proper length of the same to be directed downwardly through the clean out trap 12. Similarly, the probe rod 42 is provided with a first nut 52 located below the non-metallic disk 32, and a second nut 54 threadedly positionable above the disk so as to also permit a secure fastening of the second rod to the disk while at the same time permitting a variance of length of the rod in a manner which determines its depth of penetration downwardly into the clean out trap 12.

Inasmuch as the adjustability of the length of the rods 40, 42 is apparent, it can be further seen with reference to FIG. 1 that the probe rod 40 is provided with a second threaded end 56 over which a float hinge assembly 58 is selectively positionable. In this respect, the float hinge assembly 58 may be slid upwardly over the threaded end 56 probe rod 40 and a nut 60 is then securable over the threaded end 56 so as to effectively retain the float hinge assembly in position on the rod. Through a movement of the nut 60, the desired depth of the float hinge assembly 58 in conjunction with the length of the probe rod 40 can be selectively determined whereby an early warning of water back up in the sewer clean out trap 12 can be provided in a manner yet to be described.

With further reference to the float hinge assembly 58, it can be seen that the same includes a retaining member 62 having a through-extending longitudinally directed aperture through which the probe rod 40 is positionable, and further includes a hingedly connected, laterally-extending arm 64 having a float 66 securably attached thereto. In this regard, a hinge or pivot 68 serves to operably connect the arm 64 to the retaining member 62, while permitting relative pivotal movement therebetween. By the same token, the float 66 may be attached to the arm 64 in any conventional manner and, in a typical embodiment, the float would include a cork portion 70 over which a metallic electrically-conductive cover 72 may be positioned. In this respect, the cork 70 could be provided with a coating of aluminum foil to effect the desired electrical conductivity of the float 66.

As further illustrated in FIG. 1, the probe rod 42 may be provided with a tapered end 74 which is normally spaced a short distance above the electrically-conductive float 66. Further, it can be seen that the arm 64 is limited in its downward pivotal movement by a chain 76 which serves to support the arm in the manner illustrated. Specifically, the chain 76 may be attached to the arm 64 in any conventional manner, such as through the use of a screw 78 and retaining ring 80 arrangement, while the remaining free end of the chain may be attached to a hook 77 integrally formed on a threaded rod 79. As shown, the rod 79 extends through a first aperture 86 centrally positioned in the non-metallic disk 32 and further, through a second aperture 84 centrally positioned in the male clean out cap 18. As also shown, an adjustable nut 81 may be threadedly positioned on the rod 79 proximate to a rubber seal 83, such seal serving to normally close the aperture 86 to thus prevent the escape of sewer gases from the clean out trap 12. The nut 81 also serves to limit the downward movement of the rod 79 within the clean out trap 12. In this regard, a holder 82 is also provided to prevent the movement of the rod 79 downwardly through the aperture 84 provided in the topmost portion of the sewer cap 18, as well as through the aperture 86 centrally positioned in the non-metallic disk 32.

With respect to the alarm circuit of the invention, it can be seen that the same includes a low voltage transformer 88 having an alternating current power supply 90 directed to its primary circuit and delivering a low voltage, such as 10 volts or less, through its secondary circuit defined by electrical leads 28, 30. Serially connected in electrical lead 30 is a low voltage buzzer or alarm 92, while the electrical lead 30 is securable to the probe rod 42 by any conventional securing means, such as nut 94. Similarly, the electrical lead 28 is securable to the probe rod 40 by conventional means, such as nut 96. As such, a closed electrical circuit from the transformer 88 is defined by the electrical lead 28, the probe rod 40, the arm 64, float 66, probe rod 42, and electrical lead 30. Effectively then, contact between the electrically-conductive float 66 and the probe rod 42 serves as a switching means to selectively activate the alarm 92.

FIG. 2 illustrates a second embodiment of the present invention which is designed for attachment to existing clean out traps 12 present in buildings already constructed. In this respect, it can be appreciated that it would present some difficulty to install the conduit 24 through the floor 16 in the manner of the first embodiment of the invention, and to further drill the aperture 20 through a side portion of the clean out trap 12. Accordingly, the second embodiment of the invention dispenses with the non-metallic disk 32 and rod 79 in favor of the more simplified construction illustrated. As shown then, it can be seen that the probe rods 40, 42 may be respectfully directed downwardly through apertures 98, 100 drilled directly through the sewer clean cap 18. In this regard, the clean out cap 18 would be of a non-metallic construction, so that the same would be non-electrically conductive, or alternatively, the probe rods 40, 42 could be appropriately insulated from the cap 18 through the use of conventional insulation sleeves, washers, or the like. As such, the electrical leads 28, 30 could then be appropriately attached to the respective probe rods 40, 42 in the manner illustrated in FIG. 1, while all other parts of the invention remain and function the same. In this connection, it can be appreciated that the respective nut pairs 48, 50 and 52, 54 may be appropriately moved along the probe rods 40, 42 to permit the desired depth adjustment thereof within the clean out trap 12. Of course, the chain 76 will determine the depth of the float 66 within the trap 12, and the probe rods 40, 42 may be adjusted and fixedly secured accordingly.

In operation, it can be seen that once the alarm system 10 is operably installed within a sewer clean out trap 12, the arm 64 will be supported by the chain 76 in a manner whereby the electrically-conductive metallic covered float 66 will be in a spaced apart relationship to the tapered end 74 of the probe rod 42. Further, as illustrated in FIG. 3, the various components of the system will be spaced apart from and out of engagement with an interior surface 102 of the clean out trap 12. Inasmuch as the alarm 92 will be operable when the circuit defined by electrical leads 28, 30 is closed, it can be seen that the float hinge assembly 58 operates as a switch to selectively open and close the alarm circuit. Specifically, the circuit will be closed so as to activate the alarm 92 when the float 66 comes into contact with the probe rod 42. By the same token, the circuit is open, thus inactivating the alarm 92, when the float 66 and the probe rod 42 are in a spaced apart relationship. Of course, the circuit is closed at such time as water backs up out of the sewer line 14 into the clean out trap 12, thereby causing the float to move upwardly about the pivot point or hinge 68 so as to activate the aforedescribed circuit. Thus, the activation of the alarm 92 indicates a sewer back up so that the corrective action can be taken before the same results in a flooding of dwelling spaces.

A means for checking the operability of the alarm system 10 is provided by the chain 76 and holder 82. In this regard, a manual check of the circuit can be made at any time simply by grasping the holder 82 and pulling it upwardly so as to effect a concurrent upward movement of the arm 64 about the pivot 68. This upward movement of the arm 64, of course, results in the float 66 being brought into electrical contact with the probe rod 42, thereby to activate the alarm 92, provided that the alarm system 10 is functioning as desired. Once the alarm 10 has been tested, the holder 82 can be released thereby permitting the chain 76 to move downwardly within the clean out trap 12, while the float 66 will move out of electrical contact with the probe rod 42, thus inactivating the alarm 92.

With respect to the above description then, it should be realized that the optimum dimensional relationships for the parts of the invention are deemed readily apparent and obvious to one who is skilled in the art to which the invention pertains, and all equivalent relationships to those illustrated in the drawings and described in the specification, to include modification of form, size, arrangement of parts and details of operation, are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with an upstanding pipe section whose lower end portion is in communication with a liquid flow line and which pipe section is subject to an unwanted rise of liquid level therethrough from said flow line, and an alarm device including dielectric support means supported from the upper end portion of said pipe, first and second laterally spaced apart and depending elongated electrically conductive support members having their upper end portions mounted from said support means, an elongated float arm having one end pivotally supported from the lower end portion of said first support member for limited oscillation of said arm about a horizontal axis transverse to said arm and with said arm generally horizontally disposed, the other end of said arm including an electrically conductive float supported therefrom electrically connected to the lower end portion of said first support member, the lower end of said second support member being disposed and in vertical registry with said float when said other end of said arm is disposed in its lower limit position and engageable by said float when said other end of said arm is swung upwardly toward its upper limit position, an elongated upstanding tension member having a lower end thereof anchored relative to said arm and the upper end thereof guidingly and shiftably supported from said support means for selective upward displacement relative thereto and including an abutment portion engageable with said support means to limit downward displacement of said tension member relative thereto, the limit of downward displacement of said tension member relative to said support means defining the lower limit of downward movement of the other end of said arm and said float, and electrically actuatable alarm means serially connected in an electrical circuit in which a source of electrical potential as well as said support members are serially connected.

2. The alarm device of claim 1 wherein said dielectric support means at least substantially closes the upper end of said pipe section and the upper end of said tension member is slidingly received through said support means.

3. The alarm device of claim 1 wherein said support means comprises a closure cap for the upper end of said pipe section removably support therefrom.

4. The alarm device of claim 1 wherein said abutment and said tension member include coacting means supporting said abutment on said tension member for adjustable positioning therealong to thereby enable adjustment of the lower limit of swinging of said arm.

5. The alarm device of claim 1 wherein said dielectric support means and said support members include means mounting said support members from said support means for vertical adjustment relative to the latter.

6. The alarm device of claim 1 wherein the upper end of said tension member includes a manually engageable portion thereof disposed above said support means and which may be manually engaged in order to effect an upward displacement of said tension member to thereby swing said arm upwardly and move said float into electrical contact with the lower end of said second support member for testing said circuit and said electrically actuable alarm means.

* * * * *